United States Patent [19]

Nakae et al.

[11] 4,353,817

[45] Oct. 12, 1982

[54] POLYETHYLENE BASE RESIN COMPOSITION HAVING HIGHLY FILLED WITH AN INORGANIC MATERIAL

[75] Inventors: Hiroyuki Nakae, Kawasaki; Isamu Noguchi, Tokyo; Morikuni Hasebe, Kamakura, all of Japan

[73] Assignee: The Furukawa Electric Co., Ltd., Tokyo, Japan

[21] Appl. No.: 201,066

[22] PCT Filed: Aug. 29, 1979

[86] PCT No.: PCT/JP79/00230

§ 371 Date: Apr. 18, 1980

§ 102(e) Date: Apr. 18, 1980

[87] PCT Pub. No.: WO80/00448

PCT Pub. Date: Mar. 20, 1980

[30] Foreign Application Priority Data

Aug. 29, 1978 [JP] Japan .................. 53-105318

[51] Int. Cl.$^3$ .................. C08K 3/20; C08K 9/04; C08K 3/22; C08K 5/09

[52] U.S. Cl. .................. 524/232; 524/322; 524/398; 524/399; 524/400; 524/394; 524/437

[58] Field of Search ............... 260/42.14, 42.22, 42.45, 260/42.46, 23 H, 23 AR, 42.16

[56] References Cited

U.S. PATENT DOCUMENTS

| | | | |
|---|---|---|---|
| 3,950,303 | 4/1976 | Lipscomb | 260/42.14 |
| 4,067,847 | 1/1978 | Yui et al. | 260/42.45 |
| 4,097,447 | 6/1978 | Howard | 260/42.46 |
| 4,187,210 | 2/1980 | Howard | 260/42.14 |

FOREIGN PATENT DOCUMENTS

| | | |
|---|---|---|
| 2546668 | 4/1976 | Fed. Rep. of Germany . |
| 2739429 | 3/1978 | Fed. Rep. of Germany . |
| 49-78741 | 7/1974 | Japan . |
| 51-82334 | 7/1976 | Japan . |
| 51-119054 | 10/1976 | Japan . |
| 51-132254 | 11/1976 | Japan . |
| 52-11237 | 1/1977 | Japan . |
| 52-21047 | 2/1977 | Japan . |
| 52-78948 | 7/1977 | Japan . |
| 52-123442 | 10/1977 | Japan . |
| 52-144046 | 12/1977 | Japan . |
| 53-12940 | 2/1978 | Japan . |
| 53-14751 | 2/1978 | Japan . |
| 1509283 | 5/1978 | United Kingdom . |

OTHER PUBLICATIONS

Chem. Abst. vol. 93-47861 (1980) Nakae et al (J55031871) Furukawa.
Chem. Abst., vol. 93-47833j (1980) Noguchi et al (J55023138) Furukawa.
Chem. Abst., vol. 90-24292f (1979) Nagahama et al (J53110644).
Chem. Abst., vol. 91-40413x (1979) Nakae et al (J79038344).
Derwent Abst. 22445 A/12 (J53012943) 2-6-78, Ashaii Chem. Co.
Derwent Abst. 84048 Y/47 (J52123442) 10-17-77, Mitsubishi Petro.
Derwent Abst. 09587 A/05 (J52152948) 12-19-77, Idemitsu Petro.
Derwent Abst. 56947 B/31 (J54077658) 6-21-79, Mitsubishi Petro.
Derwent Abst. 79011 A/44 (J53110644) 9-27-78, Furukawa Elect.
Derwent Abst. 24542 C/14 (J55025405) 2-23-80, Furukawa Elect.
Derwent Abst. 29882 C/17 (J55034226) 3-10-80, Furukawa Elect.
Derwent Abst. 32741 A/18 (J53030651) 3-23-78, Showa Yuka.

Primary Examiner—Paul Lieberman
Assistant Examiner—H. J. Lilling
Attorney, Agent, or Firm—Frishauf, Holtz, Goodman & Woodward

[57] ABSTRACT

The composition of this invention is a polyethylene base resin composition containing a high concentration of an inorganic material, which has high flame retardancy and sufficient tensile elongation for practical application and is adapted to be used as a raw material for a field in which high flame retardancy is demanded such as coatings for flame retardant wires and cables and flame retardant raw material of foamed product. This composition mainly consists of a resin component formed of 10 to 75 parts by weight of polyethylene having a density ranging between 0.910 and 0.945 (g/cm$^3$) and a melt index ranging from 0.01 to 2.0 (g/10 min) and 90 to 25 parts by weight of an ethylene-base copolymer and further contains 80 to 250 parts by weight of powder of a hydrated metal oxide on the basis of 100 parts by weight of the resin component of said polyethylene base resin composition.

6 Claims, No Drawings

POLYETHYLENE BASE RESIN COMPOSITION HAVING HIGHLY FILLED WITH AN INORGANIC MATERIAL

TECHNICAL FIELD

This invention relates to a novel polyethylene base resin composition which is prepared by filling a blend polymer consisting of polyethylene and an ethylene-base copolymer with a high concentration of hydrated metal oxide; is rendered extremely flame-retardant; preserves sufficient extensibility for practical application; when purposely subjected to combustion, produces a considerable amount of self-cohesive ash; and has high foam properties.

BACKGROUND ART

With polyolefins, such as polyethylene, polypropylene, polybutane-1, ethylene-propylene rubber, the oxygen index specified in the Japanese Industrial Standards JIS K 7201-1976 entitled "Combustion test method of polymers by the oxygen index method" ranges between 17 and 19. Among the plastics, the above-listed polyolefins are most inflammable and regarded as difficult to be rendered highly flame-retardant. Particularly polyethylene, a general-purpose resin, has excellent properties except combustion characteristic and is most inexpensive synthetic polymer. Therefore, a strong demand is made to render this polymer flame-retardant. Accordingly, development is strongly pushed for a process of ensuring the uninflammability of polyethylene. The conventional process of rendering polyolefins flame-retardant comprises: (1) addition of halogen compounds, (2) addition of halogen compounds+antimony trioxide, (3) addition of halogen compounds+phosphorus compounds. It is considered indispensable to apply halogens such as chlorine or bromine in order to render polyolefins flame-retardant. However, addition of a halogen series flame-retardant is indeed prominently useful to ensure the flame-retardancy of polyolefins, but is accompanied with the drawbacks that when combusted, the polyolefins noticeably evolve black smokes and corrosive and noxious gases including carbon monoxide and gases released from halogen-bearing compounds. In recent years, therefore, it is very much desired to develop a process of ensuring the flame retardancy of polyolefins. Therefore, various processes have been proposed which comprise addition of a special smoke retardant such as molybdenum trioxide to polyolefins or mixing of polyolefins with an inorganic material. To date, however, no practically acceptable process has been established. Among these proposed processes, mixing of polyolefins with an inorganic material attracts attention as a most useful means from the standpoint of saving natural resorces, facilitating incineration and eliminating environmental polutions as recently demanded from other circles of society.

For example, Japanese Patent Publication No. 51-34866 sets forth a flame-retardant composition containing ethylene-vinyl acetate copolymer, silane and hydrated inorganic filler. This composition is intended for insulation of building wiring, implement wiring and automobile wiring and undergoes cross-linking at a very high rate of 95% by irradiation of high energy electron application of a chemical cross-linking agent. The above-mentioned Japanese Patent Publication No. 51-34866 simply describes that a small amount of any other cross-linking polymer, though harmful, may be added to the aforesaid ethylene-vinyl acetate copolymer requiring addition of a silane compound, but such a polymer blend is not preferred for said invention.

Japanese Patent Disclosure (Kokai) No. 49-78741 discloses that it is possible to obtain an olefinic resin composition having excellent heat-collecting and heat-insulating properties by adding alumina trihydrate and metal oxide to a blend polymer consisting of ethylene-vinyl acetate copolymer and polyolefin resin. This invention is not characterized by applying a special type of polyethylene, but is characterized in that it is indispensable to add a metal oxide to ensure the effect of a heat-collecting property. With this invention, a filler of alumina trihydrate and metal oxide are applied in as large a total amount as over 1,000 phr (parts per hundred) of resin. The ethylene-vinyl acetate copolymer is added to elevate the adhesivity of the product to, for example, an aluminium board.

Japanese Patent Disclosure (Kokai) No. 50-145448 and Japanese Patent Disclosure (Kokai) No. 52-12134 respectively refer to a filler and composition containing a titanate series compound. These inventions describe that one of the favorable effects resulting from addition of a titanate series compound is to increase the elongation at break of various polymers. However, the properties set forth in said inventions are still unsatisfactory for the object of the present invention. In other words, the disclosed inventions simply refer to the effect of the high extensibility of the product.

DISCLOSURE OF INVENTION

Unlike the above-mentioned techniques, the present invention has developed a flame-retardant polyethylene resin composition having quite epoch-making characteristics which, though rendered flame-retardant by addition of a large amount of an inorganic material, still preserves substantially the same thermally softening property as polyethylene and moreover high extensibility; when burned, produces a large amount of self-cohesive ashes as a combustion residue; and further has high foam properties. The flame-retardant polyethylene base resin composition of this invention is characterized in that said composition mainly consists of 10 to 75 parts by weight of polyethylene having a density of 0.910 to 0.940 (g/cm$^3$) and a melt index of 0.01 to 2.0 (g/10 min) and 90 to 25 parts by weight of ethylene-base copolymer, and 80 to 300 parts by weight of powder of hydrated metal oxide are added on the basis of 100 parts by weight of the resin component of said polyethylene base resin composition.

To render polyolefins highly flame-retardant by adding high concentration of an inorganic material, the present inventors observed the combustion behavior of a composition consisting of various polyolefins such as polyethylene, polypropylene, polybutane-1, ethylene-vinyl acetate copolymer, ethylene-ethyl acrylate copolymer, and ethylene-propylene rubber, blends of said polyolefins with other compounds, inorganic fine powders added to the base polymer such as fine powders of inorganic materials of, for example, calcium carbonate, clay, aluminium hydroxide and magnesium hydroxide, silane coupling agent known to elevate the dispersibility and reinforcing effect of said fine powders of inorganic materials, surface beating agent such as a titanate series compound and various lubricants for increasing the workability of the subject composition. The present inventors further evaluated the flame retardancy of the subject composition with reference to an oxygen index, and the mechanical properties of said subject composition by a tensile strength test. As a result, the present inventors have discovered that a composition prepared by adding a hydrated metal oxide to a polymer blend prepared from specified proportions of a particular type of polyethylene and a particular type of ethylene-base copolymer preserves a synergetically high flame retardancy and extensibility and, when burned, characteristically produces a large amount of self-cohesive ashes and also has high foam properties.

The product of this invention has the following characteristics:

(1) The product is a highly flame-retardant polyethylene-base resin composition which contains powders of an inorganic material and indicates an oxygen index of over 24 and an oxygen index the same as or higher than that of soft vinyl chloride resin.

(2) Though containing a large amount of powder of an inorganic material, the product indicates an elongation at break of over 350% as determined by a tensile strength test specified in the Japanese Industrial Standards JIS C3005-1977 on "The method testing electric wires insulated by plastics". The product has sufficiently satisfactory properties as, for example, cable sheath material and foam material. In other words, the product retains the original great toughness or high extensibility and great mechanical strength of the base polymer.

(3) Though comprising an inflammable plastics compound as a base material, the product produces a large amount of self-cohesive ashes after burned, and can be expected to carry out electric and thermal insulation and surface protection.

(4) Polyolefins containing a large amount of powder of an inorganic material generally has the drawback that foaming gas noticeably escapes at the time of foaming. However, the product is not likely to give rise to such event, but in readily foamable. Moreover, the resultant foamed mass still retains the above-mentioned properties.

(5) The product has excellent workability such as readiness for kneading and extrusion.

The reason why the composition of this invention displays the above-mentioned characteristics is not yet clearly defined. However, it is assumed that the extremely fine structure of a polymer matrix and the structure of an interface between a polymer and an inorganic material bring about a desirable condition. A multicomponent product like the composition of the invention which is formed of more than two types of polymers and a powder of inorganic material has an extremely intricate and fine structures as viewed from the state in which molecules immediately related to the quality of said multi-component product are agglomerated. A matrix phase itself consisting of polyethylene and ethylene base copolymer also has a complicated structure. Though the molecules of both polymers indicate a compatible portion, yet the crystallized section of polyethylene is supposed to be free from the molecules of an ethylene base copolymer. An interface region between the powder of an inorganic material and the polymer matrix having the aforesaid extremely fine structure has too complicated a molecule arrangement for us to clearly define. Yet, the structure of said interface region probably constitutes an important source from which the characteristic quality of the composition of the invention originates. For example, the high extensibility of said composition results from the fact that the phase of the polymer matrix can be very much elongated. In this case, the structure of the aforesaid interface region should not be changed to such extent that the polymer matrix is disrupted. Further, a layer comprising air bubbles produced when a foam material is melted at high temperature should be extended biaxially without rupture. Moreover, the excape of foam gas from the interface between the polymer and inorganic material should be suppressed. The burning of the subject composition involves various factors such as heat transmission in the polymer section, thermal decomposition thereof, resultant evolution of inflammable gases and spread of flames. However, the structure of the interface between the polymer section and uninflammable inorganic material will evidently have a prominent effect on the burning condition of the subject composition. Therefore, difference in the type of the subject composition probably leads to unexpectedly noticeable variations in the degree of the flame retardancy of said composition and the physical condition of combustion residue.

As described above, polyethylene, ethylene-base copolymer and hydrated metal oxide seem to have taken a synergetic action in controlling the structure of an interface region between the polymer and inorganic material which is closely related to the property of the subject composition.

The most decisive factor of said synergetic action is assumed that polyethylene having a prescribed density and melt index has been selected.

The density of polyethylene is an index reflecting the molecular structure thereof. Polyethylene which acts as one of the base polymers of the subject composition and whose density ranges between 0.910 and 0.945 g/cm$^3$ is assumed to be the type having a density ranging between the low and medium levels, and containing a relatively large number of branches in the molecular chain. This assumption is supported by the value (determined by the infrared absorption spectrum analysis) of the light absorption coefficient K'770 at the time of peak absorption of waves 770 cm$^{-1}$ resulting from the ethyl branch and the branch of any other radical having a longer chain than the ethyl radical.

The above-mentioned branching of polyethylene has presumably elevated the compatibility of said polyethylene with an ethylene-base copolymer used as one of the base polymer, thereby exerting a favorable effect on the structure of an interface region between the polymer and inorganic material. Therefore, the subject composition is characterized in that, even where a large amount of powder of inorganic material is added, the subject composition still retains high extensibility and is rendered sufficiently flame-retardant for foaming, and, when burned, produces a large amount of self-cohesive combustion residue.

Best Mode of Carrying Out the Invention

Polyethylene which constitutes the most important factor of the above-mentioned composition of this invention should indispensably be the particular type whose density ranges between 0.910 and 0.945 g/cm$^3$, and whose melt index (MI) ranges from 0.01 to 2.0 g/10 min.

As used herein, the term "polyethylene" is defined to be the generic name of all polymers. As classified by the method of manufacture (polymerization), the polyethylene includes the high pressure type, medium and low pressure type and radiation polymerized type. Further, the medium and low pressure polyethylene is classified into the Philips process type, standard process type and Ziegler process type with respect to a polymerization catalyst. Also classification based on the density of polyethylene is widely accepted. There are known the low density polyethylene, medium density polyethylene and high density polyethylene. As described above, a large variety of polyethylene is provided. The density of polymer is generally known to reflect its structure. However, this structure largely depends on the structure and quantity of branch chains included in the molecular chains. Further, branching can be controlled by adding a small amount of α-olefins such as propylene and butene-1 as a component of a copolymer.

Therefore, the term "polyethylene", as used herein, includes not only polyethylene polymerized from ethylene alone, but also the type polymerized from ethylene and α-olefins other than ethylene.

Among the above-mentioned various types of polyethylene, the object polyethylene used in this invention is limited to the type whose density and melt index are specified.

Particularly where that type of polyethylene is used in which the value of the light absorption coefficient $K'770$ cm$^{-1}$ is determined to range between 0.5 and 6 by the following equation defining the presence of the branch of any other radical having a lower chain than the branch of the ethyl radical, then the composition of this invention is most preferred because it prominently displays its effect.

$$K'770 \text{ cm}^{-1} = \frac{1}{dl} \cdot \log \frac{I_o}{I}$$

where: d=polymer density, l=film thickness (cm), $I_o$, I=percentage permeability (%) at the base line and also of a sample as determined by the base line method.

As used herein the term "ethylene-base copolymer" includes ethylene-vinyl acetate copolymer, ethylene-ethyl acrylate copolymer, ethylene-α-olefin copolymer in which the light absorption coefficient has a value ranging between 7 and 15, and ethylene and propylene copolymer.

The above-listed ethylene-base copolymers mainly consist of ethylene (which accounts for more than 50 percent by weight) and another comonomer as a secondary component. Where the content of a comonomer is exceedingly small (less than 5 percent by weight), then the mass does not exhibit any characteristic quality. In this specification, therefore, such mass is not referred to as an ethylene-base copolymer.

If containing 5 to 75 percent by weight of vinyl acetate as a comonomer, then an ethylene-vinyl acetate copolymer used in this invention well serves the purpose either as a random type or as a block type. Further, it is possible to apply said random or block copolymer in a partly saponified form. If the content of the vinyl acetate falls below the lower limit, then the resultant copolymer does not display a flame-retarding behavior characterizing the composition of this invention. If the content of the vinyl acetate increases over the upper limit, then said vinyl acetate presents difficulties in being rendered compatible with polyolefins.

To provide a drip-free composition specified in UL-94 vertical combustion test method, it is preferred to apply an ethylene-vinyl acetate copolymer containing more than 50 percent by weight of vinyl acetate.

Further, this ethylene-vinyl acetate copolymer is desired to have a melt index smaller than 20, or preferably 10.

An ethylene-ethyl acrylate copolymer used in this invention contains more than 5 percent by weight of ethyl acrylate. Where the content of the ethyl acrylate falls below this range, then an ethylene molecular chain present in the copolymer excessively promotes the crystallinity of the copolymer, failing to display the effect of the subject composition.

An ethylene-propylene copolymer used in this invention contains more than 50 percent by weight of ethylene, and includes the so-called ethylene-propylene rubber and terpolymer consisting of ethylene-propylene-diene. The content of propylene is preferred to be 10 to 50 percent by weight.

It has been discovered during the process of preparing the composition of this invention that only that type of the ethylene-propylene-diene terpolymer which contains dicyclopentadiene as a third component is effective for the prevention of the occurrence of drips specified in the UL-94 vertical combustion test. Where, therefore, it is intended to ensure the flame retardancy of the subject composition, particularly the prevention of occurrence of drips during the vertical combustion, it is preferred to apply the ethylene-propylene-diene terpolymer.

The reason runs as follows why, in the composition of this invention prepared from polyethylene and ethylene-base copolymer, the proportion of polyethylene is defined to range between 10 and 75 percent by weight and the proportion of ethylene-base copolymer is defined to range between 90 to 25 percent by weight with a sum of the proportions of both components taken to be 100 parts by weight. Where the content of polyethylene falls below 10 percent by weight, the resultant product does not retain substantially the same degree of heat resistance as polyethylene. When, therefore, heated to about 90° to 100° C., the sample fails to hold its original form due to thermal softening. In the combustion test, the sample readily gives rise to dimensional changes and melt dripping, thus indicating drawbacks in respect of combustion behavior or flame retardancy. Where the content of polyethylene increases over 75 percent by weight, the resultant product exceedingly decreases in extensibility.

An ethylene-α-olefin copolymer in which the light absorption coefficient $K'770$ cm$^{-1}$ is determined to range between 7 and 15 represents the type of low crystallinity which contains less than 20 percent by weight of α-olefins except for propylene. Concrete types of said ethylene-α-olefins are given in the later described examples.

Where an ethylene-base copolymer used with the previously defined polyethylene is formed of particularly an ethylene-vinyl acetate copolymer or, for example, that type of the above-described ethylene-α-olefin copolymer in which the light absorption coefficient $K'770$ cm$^{-1}$ is determined to range from 7 to 15, then the former case ensures the production of a composition having an excellent flame retardancy as measured by an oxygen index. The latter case can be expected to provide a composition which shows little tendency toward a decline in the mechanical properties which might result from addition of powders of an inorganic material at high concentration.

Where a composition is formed of 100 parts by weight of a resin component prepared from 25 to 60 parts by weight of an ethylene-vinyl acetate copolymer containing 10 to 75 percent by weight of vinyl acetate and 75 to 40 parts by weight of polyethylene, and 80 to 250 parts of powders of a hydrated metal oxide as measured on the basis of 100 parts by weight of the above-mentioned composition, then said composition displays an appreciably larger oxygen index than that which is obtained by simply arithmetically adding together the oxygen index of a composition prepared from the ethylene-vinyl acetate copolymer and the powder of hydrated metal oxide and the oxygen index of a composition prepared from the polyethylene and the powder of hydrated metal oxide. The composition of this invention prepared from particularly 55 to 40 parts by weight of an ethylene-vinyl acetate copolymer and hydrated metal oxide shows a larger oxygen index than when said subject composition might be formed of the ethylene-vinyl acetate copolymer alone.

A hydrated metal oxide used in this invention is a compound which is expressed by the general structural formula $M_mO_n$, $XH_2O$ (where m and n are larger integers than 1 determined by the valence of a metal included in the above-mentioned metal oxide), and whose decomposition is commenced at a temperature ranging from 150° to 450° C., or a double salt containing said compound. The hydrated metal oxide concretely includes, for example, aluminum hydroxide ($Al_2O_3.3H_2$ or $Al(OH)_3$), magnesium hydroxide ($MgO.H_2O$ or $Mg(OH)_2$), calcium hydroxide ($CaO.H_2O$ or $Ca(OH)_2$), barium hydroxide ($BaO.H_2O$ or $BaO.9H_2O$), hydrate of zirconium oxide ($ZrO.nH_2O$), hydrate of stannous oxide ($SnO.nH_2O$), basic magnesium carbonate ($3MgCO_3.Mg(OH)_2.3H_2O$), hydrotalcite ($6MgO.Al_2O_3.H_2O$), dawsonite ($NaCO_3.Al_2O_3.nH_2O$), and borax ($Na_2O.B_2O_3.5H_2O$).

The temperature at which the resin used in this invention is thermally decomposed falls within the range of temperature in which a hydrated metal oxide begins to be decomposed. The above-mentioned coincidence between both decomposition temperatures greatly contributes to the flame retardancy of the subject composition due to the effective expellation of bound water, the dilution of said composition resulting from vaporization and heat absorption. It is also possible to carry out the thermal decomposition in a plurality of stages by adding more than two kinds of the aforesaid hydrated metal oxide. Aluminum hydroxide and magnesium hydroxide having an excellent effect and capable of being produced at a relatively low cost is most favorably accepted.

For the object of this invention, the hydrated metal oxide is applied in the form of powder, whose average particle size generally ranges between 0.01 to 30 microns, preferably from 0.05 to 10 microns, or more preferably 0.1 to 2.0 microns. Where the particle size exceeds the above-mentioned range, then a molded product will undesirably have a roughened surface, decline in mechanical strength and decrease in flame retardancy. Where the particle size falls below 0.01 microns, then the improvement of the tensile property of the resultant product by addition of a surface-treating agent will be reduced. For the object of this invention, it is possible to apply a hydrated metal oxide such as dawsonite which is obtained in the form of fibers.

With this invention, the content of the hydrated metal oxide is chosen to range between 80 and 250 parts by weight on the basis of 100 parts by weight of resin component. Where the content of the hydrated metal oxide does not reach the lower limit, then the resultant composition will not be rendered so highly flame-retardant as is ensured in this invention. Where the content of the hydrated metal oxide rises above the upper limit, then the resultant product will be too much reduced in mechanical property for practical application.

If the surface of the powder of an inorganic material used in this invention is previously treated with a titanate base coupling agent, then the resultant product will be noticeably improved in extensibility.

This titanate base coupling agent will later be detailed. Now description is given of, for example, isopropyl-triisostearoyl-titanate expressed by the following structural formula:

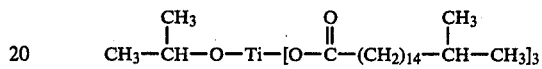

The isopropyl radical reacts with the hydroxy radical deposited on the surface of the powder of an inorganic material to expel isopropyl alcohol. At this time, the surface of the powder of the inorganic material and an atom of titanium are bonded together by means of an atom of oxygen, causing the surface of the powder of the inorganic material to be coated with the stearoyl radical. This stearoyl radical is supposed to be compatible with the matrix-forming molecular chain of a polymer and physically entangled or chemically bonded therewith. It is not yet clearly defined why the treatment of the surface of the powder of the inorganic material by the above-mentioned titanate base coupling agent prominently improves the extensibility a polyethylene resin composition containing a large amount of an inorganic material. However, said increased extensibility is assumed to result not only from the elevated dispersibility of the powder of the inorganic material by the titanate base coupling agent, but also from favorable interaction between a hydrocarbon radical having a relatively large number of carbon atoms and a long chain like that which is included, for example, in the stearoyl radical, and a short chain branch included in a polymer.

The titanate base compound is monoalkoxy organic titanate, and includes isopropyl-triisostearoyl-titanate, isopropyl-isostearoyl-dimethacryl-titanate, isopropyl-isostearoyl-diallyl-titanate, isopropyl-tri(dioctylphosphate) titanate, and isopropyl-tri(dioctyl-pyrophosphate) titanate. Particularly preferred among the above-listed titanate base compounds is monoalkoxy isopropyl-triisostearoyl titanate which has a saturated aliphatic acid radical, is readily handled and very much compatible with polyolefins, and prominently improves the extensibility of the subject composition. The content of this last mentioned titanate base compound is chosen to range between 0.1 and 10, or preferably 0.5 and 7 parts by weight on the basis of 100 parts by weight of the inorganic material. It is preferred to carry out the pretreatment of the surface of the powder of the inorganic material, because it enables the subsequent full-scale treatment by the titanate base compound to be undertaken efficiently and at low cost. However, it is possible to add the powder of the inorganic material polyolefins and apply said titanate base compound when the mixture is kneaded.

Powder of a hydrated metal oxide whose surface is treated with the titanate base compound should be applied in an amount ranging between 100 and 250, preferably 100 and 200 parts by weight on the basis of 100 parts by weight of a resin component. This is because the addition of said surface-treated hydrated metal oxide powder falling within the above-specified range prominently improves the extensibility of the resultant composition.

It is desired to use the ordinary lubricant in order to elevate the workability of a composition embodying this invention. Particularly preferred is the lubricant whose composition is expressed by the following structural formula:

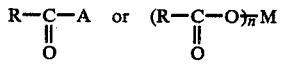

where:
R = alkyl radical having 4 to 22 carbon atoms
A = OH, NH$_2$, alkyloxy radical having 1 to 22 carbon atoms or alkenyloxy radical
N = metal atoms belonging to Groups Ia, IIa, IIb, IIIa, IIIb, IVa and IVb of the periodic table
n = a positive integer corresponding to the valence of a metal Joint use of saturated aliphatic acid having 4 to 22 carbon atoms, esters, amides or metal salts thereof and the titante base compound noticeably increases the workability and mechanical property such as extensibility of the resultant composition.

Saturated aliphatic acids having 4 to 22 carbon atoms, esters, amides and metal salts thereof are known to be effective by themselves is lubricants for polyolefins. Where, however used alone for the composition of this invention, such lubricants fail to display as much satisfactory effect as expected. Therefore, it is assumed that some kind of interaction arises between the aliphatic acid radical contained in the lubricants and titanate base compounds, giving rise to changes in the cohesive condition of the polymer phase at an interface between said polymer and hydrated metal oxide.

The saturated aliphatic acid which has 4 to 22 carbon atoms and whose composition is expressed by the aforesaid structural formula, and metal salts, esters and amides thereof include salts of metals such as Na, Al, Zn and Sn of stearic acid, isostearic acid, lactic acid, capric acid, caproic acid, lauric acid, and oleic acid. Esters of the above-mentioned aliphatic acids include vinylstearate, and n-butyl stearate. Amides of said aliphatic acids include amide stearate, amide oxystearate, amide oleate, and amide ricinoleate. The content of the saturated aliphatic acid having 4 to 22 carbon atoms, and metal salts ester and amides thereof is chosen to range between 0.5 and 10 parts by weight on the basis of 100 parts of the whole resin component. Where the above-mentioned content falls below the lower limit, then it is impossible to suppress the adhesivity of the kneaded mass to a kneader. Where the content increases over the upper limit, then the kneaded mass becomes exceedingly slippery, rather obstructing the uniform dispersion of a filler in a resin.

The composition of this invention may be mixed with, for example, an ultraviolet ray absorbent, antioxidant, copper toxicity inhibitor, antistatic agent, coloring matter, plasticizer, dispersant, cross-linking agent, cross-linking subagent and foaming agent. Further, subject composition may be cross-linked by emission of ionizing radiation such as electrons.

The component of the composition according to this invention are mixed by a double roll mill, Banbury type mixer, a kneader, an extruder or the like. The composition is then shaped to form a film, a sheet, a board, a pipe, etc. by generally used plastic fabrication such as extrusion, calendaring and injection moulding. The film or sheet may further by orientated either uniaxially or biaxially, thus forming a tape. Further, a foaming agent may be added to the composition, so that the composition in the form of a sheet can be linked by proper method and can then be foamed when heated, while maintaining its gel fraction at 40 to 80%.

It is not desirable that the compositions be heated to 200° C. or more during the mixing of the components. If the composition is heated to such a high temperature, the hydrated metal oxide will inevitably dehydrated. Preferably, the temperature of the composition should be 180° C. or less.

Now referring to some examples, the present invention will be described more in detail.

EXAMPLES 1-5, CONTROLS 1-3

Such compositions as listed in the following Table 1 were prepared. Each composition consisted of 60 parts by weight of polyethylene having specific density and melt index, 40 parts by weight of ethylenevinyl acetate copolymer containing 25 percent by weight of vinyl acetate (trade name: Evaflex EV360, manufactured by Mitsui Polychemical Kabushiki Kaisha) and 100 parts by weight of, as hydrated metal oxide, aluminium hydroxide (trade name: Hydilite H-42M, mean particle size 1.0µ, manufactured by Showa Denko Kabushiki Kaisha). These compositions had been prepared by thoroughly mixing the components in a double roll mill, while maintaining each component at 148° C. The compositions were then hot-pressed at 145° C., thus providing sheets 1 mm thick. Out of these sheets JIS No. 3 dumbbell-shaped test pieces were punched. The test pieces were subjected to a tensile strength test specified by Item 16, JIS C 3005-1977 "The method testing electric wires insulated by plastics", whereby their elongation and strength were measured. Further, the compositions were shaped into sheets 3 mm thick. Out of these sheets other test pieces were punched. Using these test pieces, the oxygen indices of the compositions were detected by JIS K 7201-1976 "Combustion test method of polymers by the oxygen index method". Still further, dumbbell-shaped test pieces were punched out of the sheets of the compositions. The dumbbell-shaped test pieces thus made were supported at one end and placed in a hot air bath of 100° C. for 48 hours to see how they would be deformed by heat. Moreover, to evaluate how easy or difficult it had been to mix the components of each composition in the double roll mill, it was observed how much of the composition adhered to the rolls of the mill.

The results of the above-mentioned tests and observation were as shown in Table 1. The polymers used are as follows:
Example 1: Sholex S4002B (manufactured by Showa Sekiyu Kabushiki Kaisha)
Example 2: Sholex S4002E (manufactured by Showa Sekiyu Kabushiki Kaisha)
Example 3: Neozex 2006H (manufactured by Mitsui Sekiyu Kagaku Kogyo Kabushiki Kaisha)

Example 4: Yukalon YF-30 (manufactured by Mitsubishi Yuka Kabushiki Kaisha)

Example 5: NUC-9025 (manufactured by Nippon Unicar Kabushiki Kaisha)

Control 1: Hyzex 3300F (manufactured by Mitsui Sekiyu Kagaku Kogyo Kabushiki Kaisha)

Control 2: Sholex F6050V (manufactured by Showa Denko Kabushiki Kaisha)

Control 3: Yukalon YK-30 (manufactured by Mitsubishi Yuka Kabushiki Kaisha)

The values of K'770 given in Table 1 were recorded from the infrared spectrum of film-like test pieces in such manner as described in the present specification.

As clearly understood from Table 1, only those compositions whose base polymer, i.e. polyethylene, had specified density and MI exhibited a high elongation (350% or more) and other excellent properties.

TABLE 1

| | Examples 1–5 | | | | | | | |
|---|---|---|---|---|---|---|---|---|
| | E. 1 | E. 2 | E. 3 | E. 4 | E. 5 | C. 1 | C. 2 | C. 3 |
| Polyethylene | 60 | 60 | 60 | 60 | 60 | 60 | 60 | 60 |
| Density (g/cm$^3$) | 0.940 | 0.935 | 0.922 | 0.920 | 0.918 | 0.954 | 0.960 | 0.920 |
| MI (g/10 min) | 0.20 | 0.20 | 0.7 | 1.0 | 2.0 | 1.2 | 6.0 | 4.0 |
| K'770 | 1.07 | 1.10 | 4.05 | 1.01 | 0.93 | 1.31 | 0 | 1.03 |
| EVA | 40 | 40 | 40 | 40 | 40 | 40 | 40 | 40 |
| Hydrated metal oxide Al(OH)$_3$ | 100 | 100 | 100 | 100 | 100 | 100 | 100 | 100 |
| Elongation (%) | 565 | 498 | 586 | 510 | 580 | 268 | 75 | 230 |
| Tensile strength (kg/cm$^2$) | 128 | 120 | 131 | 117 | 125 | 110 | 135 | 78 |
| Oxygen index (%) | 27 | 27 | 27 | 27 | 26 | 27 | 26 | 27 |
| Heat resistance*[1] | ° | ° | ° | ° | ° | ° | ° | x |
| Workability*[2] | ° | ° | ° | ° | ° | x | x | ° |

Note:
*[1]Mark "°" denotes those which underwent thermal deformation of 5% or less, and mark "x" those which underwent thermal deformation of more than 5%.
*[2]Mark "x" denotes those which adhered to the rolls so firmly that the sheets could not easily be peeled off, and mark "°" those which could easily peeled off.

EXAMPLES 6–9, CONTROLS 4–7

Such compositions as listed in the following Table 2 were prepared. Each of these compositions consisted of 50 parts by weight of polyethylene having a density of 0.922 g/cm$^3$ and a melt index of 0.7 (trade name: Neozex 2006H, manufactured by Mitsui Sekiyu Kagaku Kogyo Kabushiki Kaisha), 50 parts by weight of an ethylene series copolymer and 150 parts by weight of, as hydrated metal oxide, aluminium hydroxide powder (trade name: Hydilite H-42M, manufactured by Showa Denko Kabushiki Kaisha). The compositions had been prepared by thoroughly mixing the compounds in a mixing unit of Brabender Plastograph. Using the resultant mixture, test pieces were made in the same way as in Example 1. The test pieces were subjected to various test similar to those carried out in Example 1, thus evaluating their properties. The results were as shown in Table 2. All the products of Examples 6–9 exhibited a high elongation and a large oxygen index, though containing a large amount of an inorganic material.

The ethylene series copolymers used are as follows:
Example 6: Ethylene-vinyl acetate copolymer (EVA), Evaflex EV360, containing 25 percent by weight of vinyl acetate (manufactured by Mitsui Polychemical Kabushiki Kaisha)

Example 7: Ethylene-vinyl acrylate copolymer (EEA), DPDJ-6182, containing 15 percent by weight of ethyl acrylate (manufactured by Mitsui Polychemical Kabushiki Kaisha)

Example 8: Ethylene-propylene rubber (EPR), EP-07-P, containing propylene (manufactured by Mitsui Sekiyu Kagaku Kogyo Kabushiki Kaisha)

Example 9: Ethylene-α-olefin copolymer, Toughmer-4085, K'770=11.08 (manufactured by Mitsui Sekiyu Kagaku Kogyo Kabushiki Kaisha)

TABLE 2

| | Examples 6–9, Controls 4–7 | | | | | | | |
|---|---|---|---|---|---|---|---|---|
| | E. 6 | E. 7 | E. 8 | E. 9 | C. 4* | C. 5 | C. 6 | C. 7 |
| Polyethylene | 50 | 50 | 50 | 50 | 100 | | | |
| Density (g/cm$^3$) 0.922 | | | | | | | | |
| MI (g/10 min) 0.7 | | | | | | | | |
| K'770 = 4.05 | | | | | | | | |
| EVA | 50 | | | | | 100 | | |
| EEA | | 50 | | | | | 100 | |
| EPR | | | 50 | | | | | 100 |
| Ethylene-α-olefin copolymer | | | | 50 | | | | |
| Hydrated metal oxide Al(OH)$_3$ | 150 | 150 | 150 | 150 | 150 | 150 | 150 | 150 |
| Elongation (%) | 460 | 440 | 635 | 550 | 35 | 560 | 480 | 1150 |
| Tensile strength (kg/cm$^2$) | 77 | 65 | 55 | 90 | 56 | 120 | 86 | 36 |
| Oxygen index (%) | 35 | 32 | 28 | 29 | 28 | 36 | 31 | 28 |
| Heat resistance | ° | ° | ° | ° | ° | x | x | x |
| Workability** | ° | ° | ° | ° | x | x | x | x |

Note:
*The composition of Control 4 did not become homogeneous until the components were mixed three times.
**"x" denotes those which adhered much to the inner wall of the mixing unit, and "°" denotes those which caused no particular trouble.

EXAMPLES 10–11, CONTROLS 8–10

Compositions were prepared, each consisting 20 parts by weight of polyethylene having a density of 0.935 g/cm$^3$ and MI of 0.2 and K'770=1.10 (trade name: Sholex S4002E, manufactured by Showa Yuka Kabushiki Kaisha), 80 parts by weight of ethylene-vinyl acetate copolymer containing 25 percent by weight of vinyl acetate (trade name: Evaflex EV360, manufactured by Mitsui Polychemical Kabushiki Kaisha) and 100 parts by weight of powder of an inorganic material. These components were mixed and shaped in the same way as in Example 1. The properties of these compositions were evaluated. The results were as shown in Table 3.

The inorganic material powders used are as follows:
Aluminium hydroxide: Trade name Hydilite H-42M (manufactured by Showa Denko Kabushiki Kaisha)
Magnesium hydroxide: Manufactured by Kamishima Kagaku Kabushiki Kaisha
Calcium carbonate: Whiteton SSB, manufactured by Shiraishi Calcium Kogyo Kabushiki Kaisha
Hard clay: Dixie clay, manufactured by Vanderbilt, Inc.

Talc: Talc MS, manufactured by Nippon Talc Kabushiki Kaisha

As evident from Table 3, the compositions showed sufficient tensile strength, heat resistance and workability, whatever inorganic material they contained. But those containing aluminium hydroxide and magnesium hydroxide exhibited an oxygen index far larger than those of the compositions which contained calcium carbonate, hard clay and talc. Table 3 also shows the condition of ashes, i.e. the residue of forced combustion of the test pieces used for evaluating oxygen index, by means of a methane gas burner. Calcium carbonate and talc lost their original form in natural manner. The ashes of the hydroxides, which are self-cohesive, held the original form of the hydroxides. When exerted with external force, they collapsed.

TABLE 3

| | Examples 10-11, Controls 8-10 | | | | |
|---|---|---|---|---|---|
| | E. 10 | E. 11 | C. 8 | C. 9 | C. 10 |
| Polyethylene Density (g/cm$^3$) 0.935 MI (g/10 min) 0.2 K'770 = 1.10 | 20 | 20 | 20 | 20 | 20 |
| EVA | 80 | 80 | 80 | 80 | 80 |
| Aluminium hydroxide | 100 | | | | |
| Magnesium hydroxide | | 100 | | | |
| Calcium carbonate | | | 100 | | |
| Hard clay | | | | 100 | |
| Talc | | | | | 100 |
| Elongation (%) | 565 | 540 | 470 | 440 | 490 |
| Tensile strength (kg/cm$^2$) | 130 | 135 | 148 | 151 | 147 |
| Oxygen index (%) | 28 | 28 | 23 | 24 | 23 |
| Heat resistance | ○ | ○ | ○ | ○ | ○ |
| Workability | ○ | ○ | ○ | ○ | ○ |
| Condition of ashes | Self-cohesive | | Holding no original form | | |

EXAMPLES 12-15, CONTROLS 10-12

Polyethylene having a density of 0.940 g/cm$^3$, MI of 0.2 and K'770=1.07 (trade name: Sholex 4002B, manufactured by Showa Yuka Kabushiki Kaisha), ethylenevinyl acetate copolymer containing 25 percent by weight of vinyl acetate and having a density of 0.94 g/cm$^3$ and MI of 2.0, the polyethylene and copolymer being used in such amount as shown in Table 4, and 100 parts by weight of powder of aluminium hydroxide (trade name: Hydilite H-42M, manufactured by Showa Denko Kabushiki Kaisha) with a sum of the polyethylene and copolymer taken to be 100 parts by weight were mixed, thus preparing compositions. The compositions were tested in the same way as that of Example 1. The results of the test were as shown in Table 4. The composition containing 80 or more parts by weight of polyethylene had an elongation far less than 350% and, in addition, adhered to the rolls as that the components could not mixed smoothly. The composition containing no polyethylene had an insufficient heat resistance and, in addition, adhered to the rolls and had a poor workability. By contrast, the compositions containing 20 to 60 parts by weight of polyethylene exhibited an elongation well over 350%, a high heat resistance, a good workability. Surprisingly, they had an extremely large oxygen index. Obviously they proved excellent in flame retardancy.

As proved by Examples 12 and 13, where ethylenevinyl acetate copolymer is used in an amount of less than 60 parts by weight and more than 20 parts by weight, the composition tends to have its oxygen index particularly elevated.

TABLE 4

| | Example 12-15, Controls 10-12 | | | | | | |
|---|---|---|---|---|---|---|---|
| | C. 10 | C. 11 | E. 12 | E. 13 | E. 14 | E. 15 | C. 12 |
| Polyethylene Density (g/cm$^3$) 0.940 MI (g/10 min) 0.2 K'770 = 1.07 | 100 | 80 | 60 | 45 | 40 | 20 | 0 |
| EVA | 0 | 20 | 40 | 55 | 60 | 80 | 100 |
| Hydrated metal oxide Al(OH)$_3$ | 100 | 100 | 100 | 100 | 100 | 100 | 100 |
| Elongation (%) | 40 | 120 | 410 | 555 | 565 | 590 | 650 |
| Tensile strength (kg/cm$^2$) | 50 | 85 | 95 | 125 | 128 | 131 | 155 |
| Oxygen index (%) | 24 | 25 | 30 | 32 | 27 | 28 | 29 |
| Heat resistance | ○ | ○ | ○ | ○ | ○ | ○ | x |
| Workability | x | x | ○ | ○ | ○ | ○ | x |

EXAMPLES 16-20

30 parts by weight of polyethylene having a density of 0.940 g/cm$^3$ and MI of 0.2 g/min (trade name: Sholex 4002B, manufactured by Showa Yuka Kabushiki Kaisha), 70 parts by weight of, as an ethylene-base copolymer, ethylene-α-olefin copolymer having a density of 0.89 g/cm$^3$ and MI of 0.2 (trade name: Toughmer A-4090, manufactured by Mitsui Yuka Kagaku Kogyo Kabushiki Kaisha) and 100 to 200 parts by weight of powder of aluminium hydroxide (trade name: Hydilite H-42M, manufactured by Showa Denko Kabushiki Kaisha) were mixed to form such compositions as shown in the following Table 5. The products were tested in the same way as that of Example 6. The results were as shown also in Table 5. Even the composition containing 200 parts by weight of powder of aluminium hydroxide had an elongation of 350% or more. The compositions obtained exhibited good characteristics.

TABLE 5

| | Examples 16-20 | | | | |
|---|---|---|---|---|---|
| | E. 16 | E. 17 | E. 18 | E. 19 | E. 20 |
| Polyethylene | 30 | 30 | 30 | 30 | 30 |
| Ethylene-α-olefin copolymer (K'770 = 7.53) | 70 | 70 | 70 | 70 | 70 |
| Hydrated metal oxide Al(OH)$_3$ | 100 | 120 | 150 | 170 | 200 |
| Elongation (%) | 640 | 620 | 580 | 520 | 390 |
| Tensile strength (kg/cm$^2$) | 133 | 120 | 105 | 90 | 58 |
| Oxygen index (%) | 25 | 27 | 29 | 30 | 32 |
| Heat resistance | ○ | ○ | ○ | ○ | ○ |
| Workability | ○ | ○ | ○ | ○ | ○ |

EXAMPLES 21-27

15 parts by weight of polyethylene having a density of 0.935 g/cm$^3$ and MI of 0.20 (trade name: Sholex S4002E, manufactured by Showa Yuka Kabushiki Kaisha), 85 parts by weight of ethylene-vinyl acetate copolymer containing 25 percent by weight of vinyl acetate, 100 to 170 parts by weight of powder of aluminium hydroxide (trade name: Hydilite H-42M, manufactured by Showa Denko Kabushiki Kaisha) with the resin consisting of the polyethylene and copolymer taken to be 100 parts by weight, 3 parts by weight of, as titanate series compound, isopropyl-triisostearoyl titanate (trade name: KENREACT TTS, manufactured by Kenrich Petrochemical, Inc.) with the powder of aluminium hydroxide taken to be 100 parts by weight and 1 parts by weight of zinc stearate (1st-grade reagent) with the resin taken to be 100 parts by weight were mixed to form compositions. The compositions were tested in the same way as that of Example 6. The composition of Example 26 contained no zinc stearate, and the composition of Example 27 contained neither zinc stearate nor the titanate series compound. The results of the test were as shown in the following Table 6.

As evident from Table 6, all the compositions listed therein exhibited an elongation of 350% or more, a large oxygen index, a high heat resistance and an excellent workability. Particularly, the elongation was improved by addition of aforesaid titanate series compound. Further, the elongation was further promoted by using zinc stearate, i.e. a fatty acid series compound, which is represented by the following general formula:

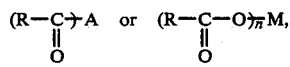

where $R = C_4-C_{22}$ alkyl group, $A = OH$, $HN_2$, a $C_1-C_{22}$ alkyloxy group or alkenyloxy group, $M$ = metal atoms of Groups Ia, IIa, IIb, IIIa, IIIb, IVa and IVb of the periodic table, and $n$ = a positive integer corresponding to the valence of metal.

Still further, the compositions did not adhere to the inner surfaces of the mixing unit of Brabender Plastograph, and thus proved to have their workability improved very much.

TABLE 6

| | Examples 21-27 | | | | | | |
|---|---|---|---|---|---|---|---|
| | E. 21 | E. 22 | E. 23 | E. 24 | E. 25 | E. 26 | E. 27 |
| Polyethylene Density (g/cm³) 0.94 MI (g/10 min.) 0.20 K'770 = 1.07 | 15 | 15 | 15 | 15 | 15 | 15 | 15 |
| EVA | 85 | 85 | 85 | 85 | 85 | 85 | 85 |
| Aluminium hydroxide | 80 | 100 | 120 | 150 | 170 | 150 | 150 |
| Surface treatment agent | 2.4 | 3.0 | 3.6 | 4.5 | 5.1 | 4.5 | 0 |
| Zinc stearate | 0 | 1 | 1 | 1 | 1 | 0 | 0 |
| Elongation (%) | 660 | 658 | 592 | 525 | 350 | 490 | 440 |
| Tensile strength (kg/cm²) | 130 | 128 | 95 | 84 | 50 | 76 | 80 |
| Oxygen index (%) | 25 | 28 | 31 | 35 | 38 | 35 | 35 |
| Heat resistance | ○ | ○ | ○ | ○ | ○ | ○ | ○ |
| Workability | ○ | ○ | ○ | ○ | ○ | ○ | ○ |

EXAMPLES 28-36

50 parts by weight of ethylene-vinyl acetate copolymer containing 25 percent by weight of vinyl acetate (trade name: Evaflex EV360 having a melt index of 0.2, manufactured by Mitsui Polychemical Kabushiki Kaisha), 50 parts by weight of medium pressure polyethylene (trade name: Neozex 2006H, density of 0.922 g/cm³, →melt index of 0.7, manufactured by Mitsui Sekiyu Kagaku Kobyo Kabushiki Kaisha) and 100, 150 or 200 parts by weight of powder of aluminium hydroxide (trade name: Hydilite H-32, mean particle size of 3.5μ, manufactured by Showa Denko Kabushiki Kaisha) were mixed to form compositions in the same way as that of Example 6. The oxygen index of each of these compositions was measured in the same way as was that of the composition of Example 1. Out of the sheets of these compositions, all 1 mm thick, dumbbell-shaped test pieces were punched. The test pieces were subjected to the test specified by Item 16, JIS C 3005-1977 "The method testing electric wires insulated by plastics", whereby their tensile strength and elongation at break were measured. The results of the test were as shown in the following Table 7.

Other compositions were prepared, which were identical with those mentioned in the preceding paragraph, except that the powder of aluminium hydroxide were preliminarily surface-treated with isopropyl-triisostearoyl titanate used in an amount of 5 parts by weight with the powder of aluminium hydroxide taken to be 100 parts by weight. The same test was conducted on these compositions.

Still further, other compositions were prepared, which were identical with those mentioned in the preceding paragraph, except that, in addition to the surface treatment of the powder of aluminium hydroxide with isopropyl-triisostearoyl titanate, zinc stearate was added in an amount of 1.5 parts by weight with all the resin taken to be 100 parts by weight. The same test was conducted on these compositions, too. The results of the test were as shown in Table 7.

As evident from Table 7, isopropyl-triisostearoyl titanate used as a surface treatment agent did not affect the oxygen index at all. The oxygen index was not affected when zinc stearate was added to this compound. The compositions containing powder of aluminium hydroxide surface-treated with isopropyl-triisostearoyl titanate had their tensile strength and other properties improved far more than the compositions containing powder of aluminium hydroxide not surface treated. The tensile strength and other properties were further improved when zinc stearate was used together with isopropyl-triisostearoyl titanate, as evident from Table 7.

To evaluate the mixing workability of each composition, a Banbury type mixer was used, and the components of each composition were mixed, while maintaining the resin at 156° C. The compositions which contained isopropyl-triisostearoyl titanate and zinc stearate proved to have a good workability in comparison with the other compositions. That is, the whole composition could be taken out of the Banbury type mixer in a single dump-out. By contrast, any one of the other compositions adhered to the inner surfaces of the Banbury type mixer, and the entire composition could not be taken out from the mixer in a single dump-out in many cases.

TABLE 7

| No. | Aluminium hydroxide (parts by weight) | Isopropyl-triisostearoyl titanate (parts by weight) | Zinc stearate (parts by weight) | Oxygen index (%) | Tensile strength (kg/cm²) | Elongation at (break (%) |
|---|---|---|---|---|---|---|
| Example 28 | 100 | — | — | 31 | 103 | 550 |

TABLE 7-continued

| No. | Aluminium hydroxide (parts by weight) | Isopropyl-triisostearoyl titanate (parts by weight) | Zinc stearate (parts by weight) | Oxygen index (%) | Tensile strength (kg/cm²) | Elongation at (break (%) |
|---|---|---|---|---|---|---|
| 29 | 100 | 5 | — | 31 | 105 | 660 |
| 30 | 100 | 5 | 1.5 | 31 | 102 | 720 |
| 31 | 150 | — | — | 38 | 85 | 360 |
| 32 | 150 | 5 | — | 38 | 103 | 410 |
| 33 | 150 | 5 | 1.5 | 38 | 99 | 500 |
| 34 | 200 | — | — | 44 | 78 | 210 |
| 35 | 200 | 5 | — | 44 | 85 | 330 |
| 36 | 200 | 5 | 1.5 | 44 | 93 | 400 |

EXAMPLES 37–38, CONTROLS 13–14

60 parts by weight of polyethylene having a density of 0.920 g/cm³, a melt index of 1.5 and K′770=2.87 (trade name: Neozex 2015M, manufactured by Mitsui Yuka Kagaku Kogyo Kabushiki Kaisha), 40 parts by weight of ethylene-vinyl acetate copolymer containing 19 percent by weight of vinyl acetate and having a density of 0.94 g/cm³ and a melt index of 2.5 (trade name: Evaflex EV460, manufactured by Mitsui Polychemical Kabushiki Kaisha), a surface treatment agent consisting of titanate series compound, i.e. isopropyl-dimethacrylisostearoyl titanate (trade name: KEN-REACT TSM2-7, manufactured by Kenrich Petrochemical, Inc.) and powder of aluminium hydroxide (trade name: Hydilite H-32, manufactured by Showa Denko Kabushiki Kaisha) were mixed to from compositions in the same way as the composition of Example 1, the surface treatment agent and the powder of aluminium hydroxide being used in such amount as shown in the following Table 8. The powder of aluminium hydroxide had been preliminarily surface-treated with the titanate series compound, using a high-speed stirring mill for use in laboratory.

Other compositions (hereinafter called "Controls 13 and 14) were prepared, which were to be compared with the compositions stated in the preceding paragraph and which were identical with said compositions except that use was made of a silane series (coupling agent, i.e. vinyl-tri(2-methoxyethoxy) silane (trade name: A-172, manufactured by Nippon Unicar Kabushiki Kaisha) in such an amount as shown in Table 8. Also in this case the silane compound was diluted with an aqueous solution of alcohol and then was used to treat the surface of aluminium hydroxide, using the above-mentioned high-speed stirring mill.

Both Examples 37 and 38 and both Controls 13 and 14 were subjected to tensile strength test. The results of the test were as shown in Table 8. Table 8 proves that the titanate series compound, unlike silane series coupling agent, provided the composition with a high elongation.

TABLE 8

| No. | PE | EVA | Aluminium hydroxide parts by weight | Surface treatment agent parts by weight | Elongation (%) | Tensile strength (kg/cm²) |
|---|---|---|---|---|---|---|
| Example 37 | 60 | 40 | 100 | TSM2-7:2 | 550 | 85 |
| Example 38 | 60 | 40 | 150 | TSM2-7:3 | 400 | 73 |
| Control 13 | 60 | 40 | 100 | A-72:2 | 215 | 58 |
| Control 14 | 60 | 40 | 150 | A-72:3 | 50 | 30 |

EXAMPLE 39, CONTROLS 15–17

A medium pressure, highly dense polyethylene, ethylene-vinyl acetate copolymer, powder of aluminium hydroxide, a titanate compound, azodicarbonamide, i.e. foaming agent, and dicumyl peroxide, i.e. linking agent were used in such amounts as shown in the following Table 9 and were mixed in a double roll mill, the surface temperature of which was maintained at 140° C., thus preparing some compositions. The compositions were hot-pressed to form sheets each 3 mm thick. From these sheets there were cut strips 3 cm by 3 cm. The strips were each wrapped up in an aluminium foil and were then immersed in the Wood's alloy bath of 200° C. for 10 minutes. They were taken out of the bath and cooled.

The bulk density of the samples of foamed compositions was measured, and the bubble size thereof was recorded. The results were as set forth also in Table 9.

The sample of the composition according to this invention had the lowest bulk density and a uniform bubble size. (The amount of the linking agent, DCP, had been already selected and was such that each composition might have the lowest possible bulk density.)

TABLE 9

| | E. 39 | C. 15 | C. 16 | C. 17 |
|---|---|---|---|---|
| (Composition) (Parts by weight) | | | | |
| PE 1, density 0.935 g/cm³ MI 0.20 | 60 | — | 100 | — |
| PE 2, density 0.945 g/cm³ MI 0.25 | — | 60 | — | — |
| EVA | 40 | 40 | — | 100 |
| Al(OH)₃ | 150 | 150 | 150 | 150 |
| ADCA | 10 | 10 | 10 | 10 |
| Titanate compound | 4.5 | 4.5 | 4.5 | 4.5 |
| DCP | 0.8 | 0.8 | 1.0 | 0.7 |
| Density of foamed mass (g/cm³) | 0.08 | 0.13 | 0.11 | 0.24 |
| Uniformness of bubble | | Large not | Large not | Relatively not |

TABLE 9-continued

| | E. 39 | C. 15 | C. 16 | C. 17 |
|---|---|---|---|---|
| | Uniform | uniform | uniform | uniform |

Notes:
PE 1: Sholex S4002E, manufactured by Showa Yuka Kabushiki Kaisha
PE 2: Sholex S6002, manufactured by the same company as mentioned above
EVA: Evaflex EV360, VA content: 25 weight %, density: 0.95 g/cm$^3$, melt index: 2.0, manufactured by Mitsui Polychemical Kabushiki Kaisha
Al(OH)$_3$: Hydilite H-42M, manufactured by Showa Denko Kabushiki Kaisha
Titanate compound: TTS, manufactured by Kenrich Petrochemical, Inc.
ADCA: Azodicarbonamide (regent)
DCP: Dicumyl peroxide (regent)

EXAMPLE 40

If applied to a fire-resistant cable sheath, the composition of this example will bring forth good results.

About a soft cooper wire with a cross section of 3.5 mm$^2$, made of fine copper wires twisted together, a glass-mica tape 0.13 mm thick was wound so that each turn overlapped half width of the other. Then, another glass-mica tape 0.13 mm thick was wound in the same manner, thus providing a fire-resistant layer 0.5 mm thick. The fire-resistant layer was provided with an extruded coating 0.8 mm thick of polyethylene having a density of 0.92 g/cm$^3$ and a melt index of 1.0. In this way insulated wires were produced. Three insulated wires thus provided were twisted together with split fiber of polypropylene, thereby providing a strand. About the strand a nylon tape 0.05 mm thick was wound. Thereafter the strand was provided with an extruded coating 1.5 mm thick, whereby a fire-resistant cable was manufactured. The extruded coating or sheath was made of a composition which had been prepared by mixing, in a Banbury type mixer, 85 parts by weight of ethylene-vinyl acetate copolymer containing 25 percent by weight of vinyl acetate (trade name: Evaflex EV360, manufactured by Mitsui Polychemical Kabushiki Kaisha), 15 parts by weight of polyethylene having a melt index of 0.2 (trade name: Sholex 4002B, manufactured by Showa Denko Kabushiki Kaisha), 100 parts by weight of powder of aluminium hydroxide (trade name: Hydilite H-42M, manufactured by Showa Denko Kabushiki Kaisha) and lubricant, coloring agent and stabilizing agent in necessary amounts. (This composition was similar to Example 22 in respect of properties.) The fire-resistant cable thus manufactured had as good mechanical and thermal properties as those of known fire-resistant cables.

Other fire-resistant cables (i.e. Controls) were manufactured to be compared with the above-mentioned cable, in the same way as was the above-mentioned cable except that use was made of an extruded coating 1.5 mm thick of a soft polyvinyl chloride composition (corresponding to one specified by No. 2, JIS K 6723).

The fire-resistant cables using the composition of this invention and the other cables were tested in accordance with the fire resistance test standards which are shown in Table 10. The results of the test were as shown in Table 11. As this table clearly shows, the fire-resistant cables whose sheaths were made of the composition according to this invention had fire resistance improved well over that of the sheaths of the known cables (i.e. Controls). Moreover, the product of this invention emitted almost no black smoke when burnt. Nor did it emit hydrochloric acid gas at all.

TABLE 10

| Standards for testing fire-resistant cables | |
|---|---|
| Before test | Test piece must have insulation resistance of 50 MΩ or more, and must withstand 1,500V/min |
| Heating (Heat the test piece along the fire temp. curve JIS A 1340 for 30 min. 840° C. at the end of the 30 min. heating) | Test piece must withstand 600V. It must have insulation resistance of 0.4 MΩ or more. |
| After test | It must withstand 1,500V/min. |
| Combustion characteristic | It must not be burnt at 1,500 mm or more from the inner wall of the furnace |

TABLE 11

Results the fire resistance test

| | | Cables (Example 40) | | | Controls | | |
|---|---|---|---|---|---|---|---|
| | | No. 1 | No. 2 | No. 3 | No. 1 | No. 2 | No. 3 |
| Before test Insulation resistance (MΩ) | | Passed the test | | | Passed the test | | |
| after 30 min. heating | | 8.0 | 9.5 | 9.5 | 1.2 | 1.0 | 2.5 |
| Insulation withstand voltage | During heating 600V | Passed the test | | | Passed the test | | |
| | After combustion 1,500V/min. | " | | | " | | |
| Combustion characteristic (mm) | Left: | 50 | 50 | 50 | 60 | 55 | 55 |
| | Right: | 60 | 50 | 50 | 50 | 50 | 50 |
| Breakdown voltage (V) | | 2,700 | 2,800 | 2,850 | 1,700 | 1,700 | 2,000 |

EXAMPLES 41–47, CONTROL 18

Compositions were prepared, each by mixing, in the same way as in Example 6, 50 parts by weight of polyethylene having a density of 0.922 g/cm$^3$, MI of 0.7 and K'770=4.05 (trade name: Neozex 2006H, manufactured by Mitsui Sekiyu Kagaku Kogyo Kabushiki Kaisha), 50 parts by weight of ethylene-vinyl acetate copolymer containing vinyl acetate in such an amount as shown in Table 12 and 100 parts by weight of powder of aluminium hydroxide (trade name: Hydilite H-42M, manufactured by Showa Denko Kabushiki Kaisha). The compositions were shaped and tested in the same way as that of Example 6. The results of the test were as shown in Table 12.

The ethylene-vinyl acetate copolymers used are as follows:

Example 41: DQDJ-1830 (trade name) having a density of 0.93 g/cm$^3$ and MI of 3 (manufactured by Nippon Unicar Kabushiki Kaisha). Example 42: Evaflex EV560 (trade name) having a density of 0.93 g/cm$^3$ and MI of 3.5 (manufactured by Mitsui Polychemical Kabushiki Kaisha). Example 43: Evaflex EV460 (trade name) having a density of 0.94 g/cm$^3$ and MI of 2.5 (manufactured by Mitsui Polychemical Kabushiki Kaisha). Example 44: Evaflex EV360 (trade name) having a density of 0.95 g/cm$^3$ and MI of 2 (manufactured by Mitsui Polychemical Kabushiki Kaisha). Example 45: Evaflex EV260 (trade name) having a density of 0.95 g/cm³ and MI of 6 (manufactured by Mitsui Polychemical Kabushiki Kaisha). Example 46: Evaslen 410-P (trade name) having a density of 1.04 g/cm³ and MI of 1 or less (manufactured by Dainippon Ink Kabushiki Kaisha). Example 47: Evaslen 310-P (trade name) having a density of 10.7 g/cm³ and MI of 1 or less (manufactured by Dainippon Ink Kabushiki Kaisha). Control 18: Yukalon YF-30 (trade name) having a density of 0.92 g/cm³ and MI of 1.

As evident from Table 12, the oxygen index increased in proportion to the content of vinyl acetate as long as the content of vinyl acetate was within the range of 10 to 19%. When the content of vinyl acetate was over 19%, the oxygen index stayed almost unchanged. On the other hand, the elongation and tensile strength were high and good when the content of vinyl acetate was 19 to 33%. The heat resistance and workability were good. Thus, it is particularly preferred that use should be made of ethylene-vinyl acetate copolymer containing 15 to 30% of vinyl acetate in order to provide a composition which is highly flame-retardant and which has an excellent tensile strength.

TABLE 12

|  | E. 41 | E. 42 | E. 43 | E. 44 | E. 45 | E. 46 | E. 47 | C. 18 |
|---|---|---|---|---|---|---|---|---|
| Polyethylene | 50 | 50 | 50 | 50 | 50 | 50 | 50 | 50 |
| EVA | 50 | 50 | 50 | 50 | 50 | 50 | 50 | 50 |
| (VA content in wt. %) | 10 | 14 | 19 | 25 | 33 | 60 | 75 | 0 |
| Hydrated metal oxide Al(OH)₃ | 100 | 100 | 100 | 100 | 100 | 100 | 100 | 100 |
| Elongation (%) | 355 | 440 | 530 | 560 | 560 | 540 | 510 | 8 |
| Tensile strength (kg/cm²) | 67 | 82 | 97 | 115 | 99 | 76 | 65 | 105 |
| Oxygen index (%) | 26 | 30 | 32 | 32 | 33 | 32 | 32 | 24 |
| Heat resistance | ∘ | ∘ | ∘ | ∘ | ∘ | ∘ | ∘ | ∘ |
| Workability | ∘ | ∘ | ∘ | ∘ | ∘ | ∘ | ∘ | ∘ |

EXAMPLES 48–50, CONTROLS 19–21

A composition (Example 48) was prepared by mixing, in the same way as in Example 6, 40 parts by weight of the same polyethylene as used in Example 41, 50 parts by weight of ethylene-vinyl acetate copolymer containing 25 percent by weight of vinyl acetate (trade name: Evaflex EV360, manufactured by Mitsui Polychemical Kabushiki Kaisha), 10 parts by weight of, as a third polymer component, polybutene-1 having a density of 0.915 g/cm³ (trade name: WITRONO 100, manufactured by Witco Chemical, Inc.) and 100 parts by weight of powder of aluminium hydroxide (trade name: Hydilite H-42M, manufactured by Showa Denko Kabushiki Kaisha). Another composition (Example 49) was prepared, which was identical with Example 48, except that the content of said polyethylene was reduced to 30 parts by weight and the content of said polybutene-1 was increased to 20 parts by weight. Still another composition was prepared, which was identical with Example 48, except that the third polymer used was polypropylene (trade name: Mitsubishi Noblene MA6, density: 0.90 g/cm³, MI: 1.3, manufactured by Mitsubishi Yuka Kabushiki Kaisha). Further, compositions containing no polyethylene (Controls 19–21) were prepared. All these compositions were tested in the same way as was the composition of Example 6. The results of the test were as shown in Table 13.

As evident from Table 13, the compositions which contained a small amount of a third polymer component in addition to the polyethylene and ethylene-base copolymer also exhibited a high elongation and a large oxygen index. By contrast, the compositions which contained only ethylene-base copolymer and a third polymer component exhibited a far lower elongation.

TABLE 13

|  | E. 48 | E. 49 | E. 50 | C. 19 | C. 20 | C. 21 |
|---|---|---|---|---|---|---|
| Polyethylene | 40 | 30 | 40 | — | — | — |
| Ethylene-vinyl acetate copolymer (EVA) | 50 | 50 | 50 | 50 | 70 | 30 |
| Third polymer |  |  |  |  |  |  |
| 1 Polybutene-1 | 10 | 20 | — | 50 | 30 | — |
| 2 Polypropylene | — | — | 10 | — | — | 70 |
| Aluminium hydroxide | 100 | 100 | 100 | 100 | 100 | 100 |
| Elongation (%) | 540 | 395 | 525 | 57 | 48 | 32 |
| Tensile strength (kg/cm²) | 77 | 64 | 68 | 98 | 59 | 120 |
| Oxygen index (%) | 31 | 32 | 32 | 27 | 27 | 26 |
| Heat resistance | ∘ | ∘ | ∘ | ∘ | ∘ | ∘ |
| Workability | ∘ | ∘ | ∘ | ∘ | ∘ | ∘ |

EXAMPLES 51–55

Compositions were prepared, each by mixing, in the same way as in Example 6, 50 parts by weight of polyethylene having a density of 0.490 g/cm³, MI of 0.2 and K'770=1.07 (trade name: Sholex 4002B, manufactured by Showa Denko Kabushiki Kaisha), 50 parts by weight of, as ethylene-base copolymer, one selected from such three ethylene-vinyl acetate copolymers and two ethylene-propylene-diene terpolymer as shown in Table 14, 150 parts by weight of powder of aluminium hydroxide having mean particle size of 0.8μ (trade name: Hydilite H-42M, manufactured by Showa Denko Kabushiki Kaisha) and 4.5 parts by weight of, as titanate compound, isopropyltriisostearoyl titanate (trade name: KENREACT TTS, manufactured by Kenrich Petrochemical, Inc.). These compositions were shaped and tested in the same way as that of Example 6. Of each composition there were made test pieces, 3.18 mm thick, 12.7 mm wide and 127 mm long. The test pieces of the compositions were subjected to a combustion test specified in UL-94 vertical combustion test method. The results of the test were as shown in Table 14.

The ethylene-base copolymers used are as follows:
Example 51: Evaflex EV360 (trade name, manufactured by Mitsui Polychemical Kabushiki Kaisha)
Example 52: Evaslen 410-P (trade name, manufactured by Dainippon Ink Kabushiki Kaisha)
Example 53: Evaslen 310-P (trade name, manufactured by Dainippon Ink Kabushiki Kaisha)
Example 54: Mitsui EPT #1070 (trade name, manufactured by Mitsui Sekiyu Kagaku Kabushiki Kaisha)
Example 55: Mitsui EPT #4070 (trade name, manufactured by Mitsui Sekiyu Kagaku Kabushiki Kaisha)

As shown in Table 14, all the compositions exhibited an oxygen index over 30. They had good tensile strength and good workability. Of these compositions, those which were graded as "V-0" by UL-94 vertical combustion test method contained ethylene-vinyl acetate copolymer containing 60 or more percent by weight of vinyl acetate or ethylene-propylene-diene copolymer containing, as third component, dicyclopentadiene.

TABLE 14

|  | E. 51 | E. 52 | E. 53 | E. 54 | E. 55 |
|---|---|---|---|---|---|
| Polyethylene | 20 | 50 | 50 | 50 | 50 |
| Ethylene-base copolymer |  |  |  |  |  |
| °EVA 1 (VA: 25%) | 50 |  |  |  |  |
| °EVA 2 (VA: 60%) |  | 50 |  |  |  |
| °EVA 3 (VA: 75%) |  |  | 50 |  |  |
| °EPDM 1 (Third component: DCPD, iodine number: 12) |  |  |  | 50 |  |
| °EPDM 2 (Third component: ethylene norbornen (ENB), iodine number: 24) |  |  |  |  | 50 |
| Aluminium hydroxide | 150 | 150 | 150 | 150 | 150 |
| Elongation (%) | 405 | 390 | 370 | 410 | 395 |
| Tensile strength (kg/cm$^2$) | 67 | 58 | 55 | 49 | 47 |
| Oxygen index (%) | 34 | 36 | 35 | 31 | 30 |
| UL-94 vertical combustion test | x | V-0 | V-0 | V-0 | x |
| Heat resistance | ° | ° | ° | ° | ° |
| Workability | ° | ° | ° | ° | ° |

Note:
Mark "x" denotes a composition which was not graded V-0 to V-2 in UL-94 vertical combustion test.

EXAMPLES 56–61

Compositions were prepared, each by mixing, in the same way as in Example 6, 20 parts by weight of polyethylene having a density of 0.940 g/cm$^3$, MI of 0.2 and K'770=1.07 (trade name: Sholex 4002B, manufactured by Showa Yuka Kabushiki Kaisha), 80 parts by weight of ethylene-vinyl acetate copolymer containing 25 percent by weight of vinyl acetate (trade name: Evaflex EV360, manufactured by Mitsui Polychemical Kabushiki Kaisha), 110 parts by weight of Powder of aluminium hydroxide (trade name: Hydilite H-42M, manufactured by Showa Denko Kabushiki Kaisha), 11 parts by weight of isopropyl-triisostearoyl titanate (trade name: KENREACT TTS, manufactured by Kenrich Petrochemical, Inc.) and 1 part by weight of one of the following fatty acid compounds. These compositions were shaped and tested in the same way as that of Example 6.

Example 56: n-caprio acid

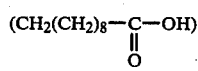

Example 57: Stearic acid

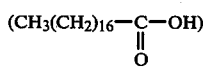

Example 58: Vinyl stearate

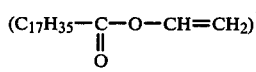

Example 59: Stearic acid amide

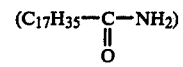

Example 60: n-butyric acid

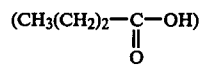

Example 61: Cerotic acid

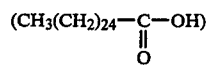

The results of the test were as shown in Table 15. All the compositions were excellent in tensile strength, flame retardancy and heat resistance.

The workability of these compositions was evaluated according to the extent to which they adhered to the inner surface of the mixing unit of Brabender Plastograph. Examples 56–59 had an excellent workability in comparison with Examples 60–61, and it was extremely easy to taken them out of the mixing unit. This means that addition of specific fatty acid compounds brought out particular effects. The same trend appeared with respect to elongation and strength.

TABLE 15

|  | E. 56 | E. 57 | E. 58 | E. 59 | E. 60 | E. 61 |
|---|---|---|---|---|---|---|
| Polyethylene | 20 | 20 | 20 | 20 | 20 | 20 |
| Ethylene-vinyl acetate copolymer | 80 | 80 | 80 | 80 | 80 | 80 |
| Aluminium hydroxide | 110 | 110 | 110 | 110 | 110 | 110 |
| Titanate-base compound | 1.1 | 1.1 | 1.1 | 1.1 | 1.1 | 1.1 |
| Fatty acid compound |  |  |  |  |  |  |
| °n-butyric acid |  |  |  |  | 1 |  |
| °n-caprio acid | 1 |  |  |  |  |  |
| °Stearic acid |  | 1 |  |  |  |  |
| °Vinyl stearate |  |  | 1 |  |  |  |
| °Stearic acid amide |  |  |  | 1 |  |  |
| °Cerotic acid |  |  |  |  |  | 1 |
| Elongation (%) | 595 | 600 | 610 | 620 | 570 | 575 |
| Tensile strength (kg/cm$^2$) | 128 | 125 | 127 | 124 | 116 | 114 |
| Oxygen index (%) | 28 | 28 | 28 | 28 | 28 | 28 |
| Heat resistance | ° | ° | ° | ° | ° | ° |
| Workability |  |  |  |  |  |  |

INDUSTRIAL APPLICABILITY

As apparent from the foregoing examples, the composition of this invention has high extensibility and flame retardancy, and superior properties to soft vinyl chloride, thereby meeting social requirements for the saving of natural resources and elimination of environmental pollution, and indicating great industrial merits. Therefore, the subject composition is favorably accepted as raw material for a field in which high flame retardancy is demanded, such as coating of wires and cables and raw material of foamed product which are required to have prominent flame retardancy.

We claim:

1. A polyethylene resin composition containing a high concentration of inorganic materials, characterized in that it mainly consists of a resin component formed of (i) 10 to 75 parts by weight of polyethylene which has a density ranging from 0.910 to 0.945 g/cm$^3$, and a melt index ranging from 0.01 to 2.0 g/10 min., the value of its absorptivity coefficient K′770 of the absorption peak in the proximity of 770 cm$^{-1}$ in the infrared absorption spectrum, being 0.5 to 6, and (ii) 90 to 25 parts by weight of an ethylene-vinyl acetate copolymer, said composition also contains 80 to 250 parts by weight of powdered aluminum hydroxide on the basis of 100 parts by weight of said resin component of said polyethylene resin composition and a monoalkoxy organic titanate compound.

2. The polyethylene resin composition of claim 1, wherein said ethylene-vinyl acetate copolymer contains 10 to 75 percent by weight of vinyl acetate.

3. The polyethylene resin composition of claim 1, wherein said resin component comprises 45 to 75 parts by weight of polyethylene and 55 to 25 parts by weight of said ethylene-vinyl acetate copolymer.

4. The polyethylene resin composition of claim 1, wherein said monoalkoxy organic titanate compound is at least one selected from the group consisting of isopropyl-triisostearoyl-titanate and isopropyl-isostearoyl-dimethacryl-titanate.

5. The polyethylene base composition of claim 1, which contains 100 to 200 parts by weight of said aluminum hydroxide, the surface of said aluminum hydroxide being treated with a monoalkoxy organic titanate compound on the basis of 100 parts by weight of said resin component.

6. The polyethylene resin composition of claim 1, which contains a fatty acid base compound having the following general formula:

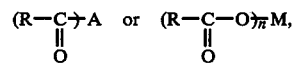

wherein
R is an alkyl radical having 4 to 22 carbon atoms,
A is OH, NH$_2$, alkyloxy or alkenyloxy radical having 1 to 22 carbon atoms,
M is a metal atom belonging to Groups Ia, IIa, IIb, IIIa, IIIb, IVa and IVb of the Periodic Table,
n is a positive integer corresponding to the valence of said metal M.

* * * * *